(12) United States Patent
Fitch et al.

(10) Patent No.: US 6,424,840 B1
(45) Date of Patent: Jul. 23, 2002

(54) METHOD AND SYSTEM FOR DYNAMIC LOCATION-BASED ZONE ASSIGNMENT FOR A WIRELESS COMMUNICATION NETWORK

(75) Inventors: James A. Fitch, Edmonds, WA (US); David L. Hose, Boulder, CO (US)

(73) Assignee: SignalSoft Corp., Boulder, CO (US)

(*) Notice: Subject to any disclaimer, the term of this patent is extended or adjusted under 35 U.S.C. 154(b) by 0 days.

(21) Appl. No.: 09/435,407

(22) Filed: Nov. 5, 1999

(51) Int. Cl.[7] .................................................. H04Q 7/20
(52) U.S. Cl. ........................................ 455/456; 455/406
(58) Field of Search ................................. 455/405, 406, 455/407, 414, 456

(56) References Cited

U.S. PATENT DOCUMENTS

| | | | | |
|---|---|---|---|---|
| 5,327,144 A | * | 7/1994 | Stilp et al. | 342/387 |
| 5,568,153 A | * | 10/1996 | Beliveau | 342/357 |
| 5,787,347 A | * | 7/1998 | Yu et al. | 455/440 |
| 5,802,468 A | * | 9/1998 | Gallant et al. | 455/422 |

* cited by examiner

Primary Examiner—Edward F. Urban
Assistant Examiner—Naghmeh Mehrpour
(74) Attorney, Agent, or Firm—Marsh Fischmann & Breyfogle LLP

(57) ABSTRACT

A method for dynamic location-based zone assignment for a wireless communication network is provided. The method utilizes the location of a user's wireless communication device relative to a number of network zones in the wireless communication network. The network zones and their respective coverage areas change from time-to-time. The method comprises receiving the location of the user's wireless communication device and accessing a geographical area definition of the user, wherein the geographical area definition includes at least one operating zone. The geographical area definition is translated to a current network area definition. The location of the user's wireless communication device is compared to the current network area definition in order to locate the user's wireless communication device relative to the operating zones. A record is then assigned based on which operating zone the user's wireless communication device is located.

21 Claims, 8 Drawing Sheets

METHOD AND SYSTEM FOR DYNAMIC LOCATION-BASED ZONE ASSIGNMENT FOR A WIRELESS COMMUNICATION NETWORK

FIELD OF THE INVENTION

This invention relates generally to the field of wireless communication systems, and more particularly to a method and system for dynamic location-based zone assignment for a wireless communication network.

BACKGROUND OF THE INVENTION

Wireless communication networks operate to communicate information, such as voice signals, images, electronic files or data, video signals, and the like, to and/or from a wireless communication device using radio waves. For example, the wireless communication network may comprise a communication system using analog, digital cellular, or PCS communication systems, a satellite communication system, a two-way radio communication system, a paging system, and the like.

The wireless communication network typically comprises a network of base stations that can communicate with the various wireless communication devices. Each base station provides communication services within its respective network zone, such that the network of base stations provides a number of network zones that can cover a large geographic area. The network zones and their respective coverage areas occasionally change as base stations are improved and added within the wireless communication network. In the United States, cellular communication networks now cover nearly all of the United States, with many of the base stations now providing digital and PCS communication systems.

In recent years, a number of location-based service applications have been implemented or proposed for wireless communication networks. Examples of such existing or proposed location-based service applications include: emergency service, location-dependent call routing, location-dependent billing, location tracking, and the like. In emergency applications, the call and the exact location of the wireless communication device may be routed to the closest provider of emergency services, thereby reducing emergency response time and possibly saving lives. In location-dependent billing applications, different billing rates may be charged to a customer for operating the wireless communication device in different geographical areas. Each location-based service application utilizes the location of the wireless communication device.

Location systems sometimes utilize conventional system reference location methods for determining or characterizing the location of the wireless communication device. Such reference location methods operate by relating the location of the wireless communication device to a network zone, e.g., cell or cell sector, of the wireless communication network. However, the configuration of the wireless communication network is time dependent. In other words, changes occur in the network zones of the wireless communication network. Some conventional location-based service applications cannot be readily adapted to the changing wireless communication network. The difficulty in adapting to the changing wireless communication network creates disadvantages for location-based service applications.

For example, location-dependent billing applications have been proposed that would utilize subscriber specific billing zones. In particular, a lower rate (e.g., competitive with land line costs) may be charged for calls placed in the vicinity of a subscriber's home, office or other prescribed location. Such applications may involve storing geographical definitions of individual subscriber operating zones on a subscriber-by-subscriber basis by reference to network subdivisions, such as cells, cell sectors and the like. As a result, substantial manual database revision may be occasioned due to network reconfiguration. Such difficulties in location-based applications may deter full implementation of certain applications or result in errors or application downtime.

SUMMARY OF THE INVENTION

Accordingly, a need has arisen for improved location data provisioning and management in a wireless communication network. The present invention provides a method and system for dynamic location-based zone assignment for a wireless communication network that substantially reduces or eliminates problems associated with prior systems and methods.

In accordance with one aspect of the present invention, a method for dynamic location-based zone assignment for a wireless communication network is provided. The method involves receiving unit location information for a wireless unit; accessing a current network topology definition including location information for network subdivisions (e.g., cells or cell sectors); accessing an operating zone definition including location information for zones of a location based services application (e.g., a location based call billing, location based call routing, or emergency service application); and correlating the unit location to the operating zone definition using the current network topology definition. In accordance with the present invention, at least one of the unit location and the zone definition is expressed in terms independent of network topology. For example, the zone definition may be expressed in terms of geographical coordinates. The unit location and operating zone definition can be correlated by processing at least one of the unit location and operating zone definition such that they are expressed in common terms. Thus, where the unit location is identified by reference to a current cell or cell sector, and the zone definition is expressed in geographical coordinates, the zone definition can be processed for expression in terms of current cell or cell sector identifiers.

The invention has particular advantages for applications including many operating zones and in systems where it is convenient to establish unit location by reference to network subdivisions.(e.g., cell, cell sector, or microcell). In such applications, the operating zones may be expressed by reference to network topology so as to facilitate correlation of unit location to particular zones by a simple process of matching network subdivision identifiers. However, for applications involving many zones if a zone definition is stored in terms of existing network topology, substantial database revisions may be occasioned in the event of changes to network topology. The present invention can be used to avoid such revisions to a significant degree by allowing for storage of an operating zone definition in terms independent of network topology and then expressing the definition in terms of current network topology as needed.

In one implementation of the present invention, a method is provided for locating a wireless unit relative to one or more billing zones of a location-based billing application. For example, the application may be a home zone application that provides a favorable billing rate for calls in the vicinity of a subscriber's home, office or other location. It will be appreciated that such an application may manage a large number of zones for multiple subscribers. The method involves: establishing a billing zone definition at a first time when a wireless network has a first topology; receiving location information for a wireless unit at a second time when the wireless network has a second topology, where at least one of the unit location and billing zone definition is established by reference to network topology; and making a determination regarding a billing zone of the wireless unit based on the unit location and the billing zone definition. In one implementation, a billing zone definition is stored in terms independent of network topology and is expressed in terms of current network topology when needed. In this manner, updates to zone definitions are not required in connection with each change in network topology and a practical process is provided for implementing location based billing applications.

Technical advantages of the present invention include providing a wireless communications network that adapts to changes in the network zones and coverage areas within the wireless communication network. Accordingly, implementation of location-based applications is improved.

Another technical advantage of the present invention is that in location-dependent billing applications, the user's geographical area definition, which includes the user's operating zone or zones, is converted to a current network topological definition based on the configuration of the wireless communication network at or near the time the wireless communication device is operated. Accordingly, the location-dependent billing application readily adapts to changes in the wireless communication network.

Another technical advantage of the present invention is that location-based service applications can be used either on a time delay basis or concurrently with the operation of the wireless communication device. Accordingly, location-based service applications can be tailored to meet the needs of a customer. For example, time delaying of a location-dependent billing application can reduce costs by accessing computer resources at off-peak times.

Other technical advantages will be readily apparent to one skilled in the art from the following figures, descriptions, and claims.

BRIEF DESCRIPTION OF THE DRAWINGS

For a more complete understanding of the present invention and further advantages thereof, reference is now made to the following description taken in conjunction with the accompanying drawings, wherein like referenced numerals represent like parts, in which.

DETAILED DESCRIPTION OF THE INVENTION

FIGS. 1 through 8 illustrate various aspects of a method and system for dynamic location-based zone assignment for a wireless communication network. As described in greater detail below, the present invention produces a record, such as a rating value for incorporation into a Call Detail Record or the like, that is based on the location of a wireless communication device relative to a number of predetermined operating zones. The present invention adapts to changes in the configuration of the wireless communication network, such as changes in the type, location, and coverage areas of the network zones. The invention can be used in connection with other location-based service applications, such as emergency service, routing services, location tracking, and the like. As a result, manual database changes in order to manage the occasional changes in the network configuration are minimized. The accuracy, efficiency, and ease of use of the various location-based service applications are thereby improved.

Figure 1:
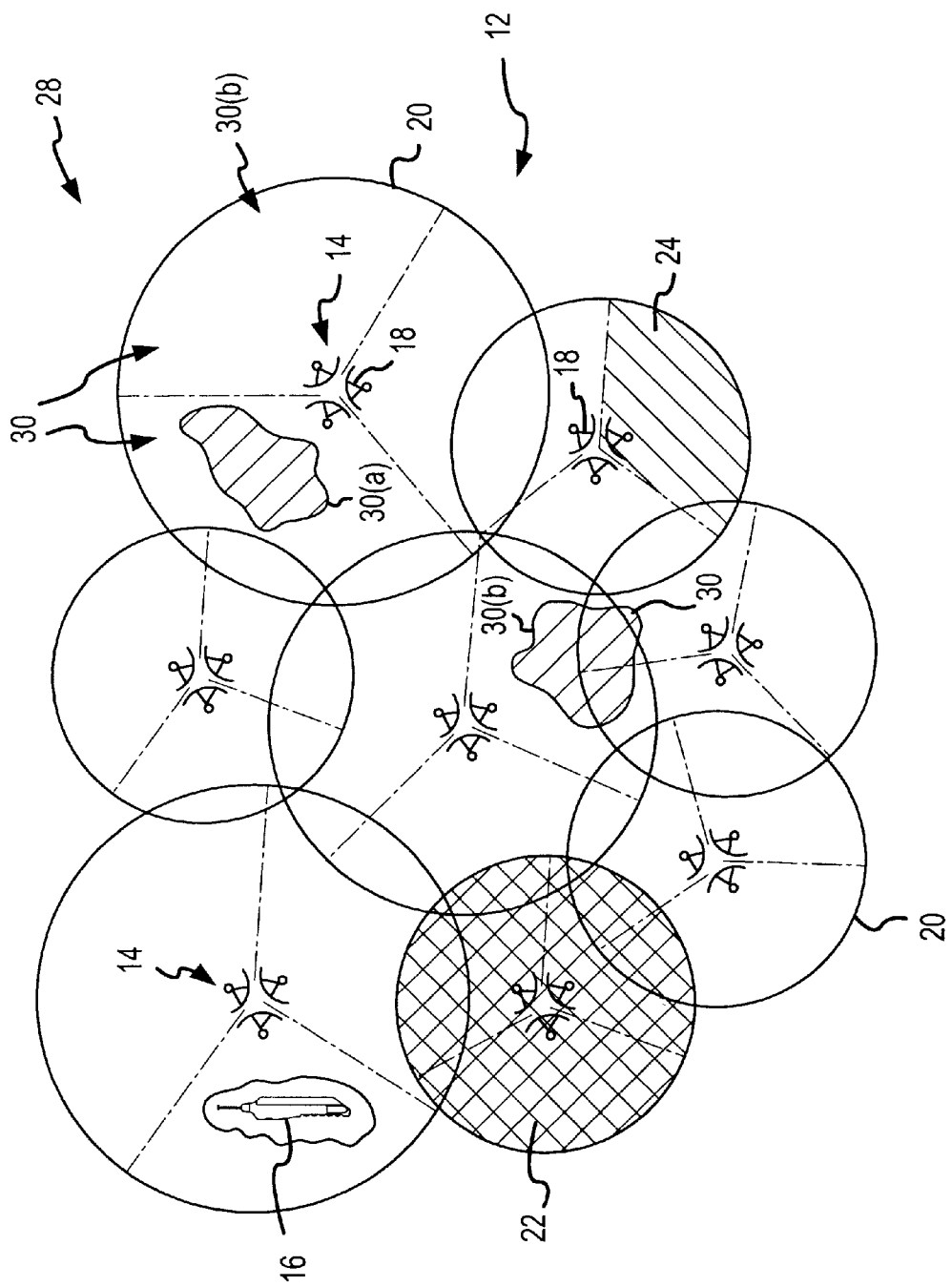
FIG. 1 is a schematic drawing illustrating the operating environment of a location-based zone assignment system for a wireless communication system in accordance with the present invention.

FIG. 1 is a schematic drawing illustrating the operating environment of a location-based zone assignment system for a wireless communication network 12. For purposes of illustration, the wireless communication network 12 is shown as a cellular communications network, however, it will be understood that the wireless communication network 12 may comprise other types of wireless communication networks without departing from the scope of the present invention. For example, the wireless communication network 12 may comprise a satellite communication network, a two-way radio communication network, or any other suitable wireless communication network.

Referring to FIG. 1, the wireless communication network 12 comprises a number of base stations 14 that can communicate with a wireless communication device 16. Each communication between the wireless communication device 16 and the base stations 14 will be referred to generally as a call, although it will be appreciated that a location determination may be based on periodic polling, power on, or other signals from the wireless communication device 16. Each base station 14 includes an antenna system 18 that operates to transmit and receive radio frequency signals from each operating wireless communication device 16 within the base station's 14 respective network zone 20. Each network zone 20 has an associated coverage area 22 that is dependent upon the signal strength and signal sensitivity of the base station 14, as well as environmental conditions, such as geography and the characteristics of the associated wireless communication device 16. Although the network zones 20 are shown as being generally circular for purposes of illustration, it will be appreciated the shapes of the coverage areas can vary. Moreover, a cell's coverage area may be divided into sectors (e.g., three 120° sectors) that are serviced by separate antennae. In general, the greater the signal strength and signal sensitivity, the larger the potential coverage area 22 of the network zone 20. The base stations 14 are geographically positioned over large areas to form a network of network zones 20 having interlaced coverage areas 22. As the wireless communication device 16 moves from one network zone 20 to another network zone 20, the base stations 14 communicate with one another to hand-off the call from the wireless communication device 16, thereby maintaining the call.

Each base station 14 can handle only a limited number of calls at any one time. For this and other reasons, the number of base stations 14 in a given geographical area generally depends upon the number of calls, i.e., call traffic, that is generated within that geographical area. For example, in high density population areas where the call traffic is high, a large number of base stations 14 with overlapping interlaced coverage areas 22 may be utilized. Conversely, in low density population areas where the call traffic is low, fewer number of base stations 14 are required and the coverage areas 22 are minimally interlaced.

Wireless communication networks 12 also utilize various types of communication technologies to communicate with the wireless communication device 16. Specifically, the wireless communication networks 12 utilize some form of an analog or digital communication technology, such as conventional analog, digital, and PCS communication technologies, for communicating with the wireless communication device 16. Digital communication technology may be preferred to analog communication technology because digital communication technology can handle higher levels of call traffic, as well as providing enhanced services, such as clearer sound quality. Accordingly, analog base stations 14 may be replaced by or coupled with digital base stations 14 to satisfy customer demands for improved services and to meet call traffic requirements.

The wireless communication network 12 may frequently change as a result of competition, demographic and population changes, as well expansion of the geographical area covered by the wireless communication network 12. In particular, the configuration of the wireless communication network 12 changes as base stations 14 are added and upgraded with improved communication and transceiver technologies. The changes in the configuration of the wireless communication network 12 directly affect the network zones 20 and their respective coverage areas 22. As will be discussed in greater detail below, the changing configuration also directly affects location-based service applications that utilize location information that describes the location of the wireless communication device 16 relative to the network zones 20.

Figure 2:
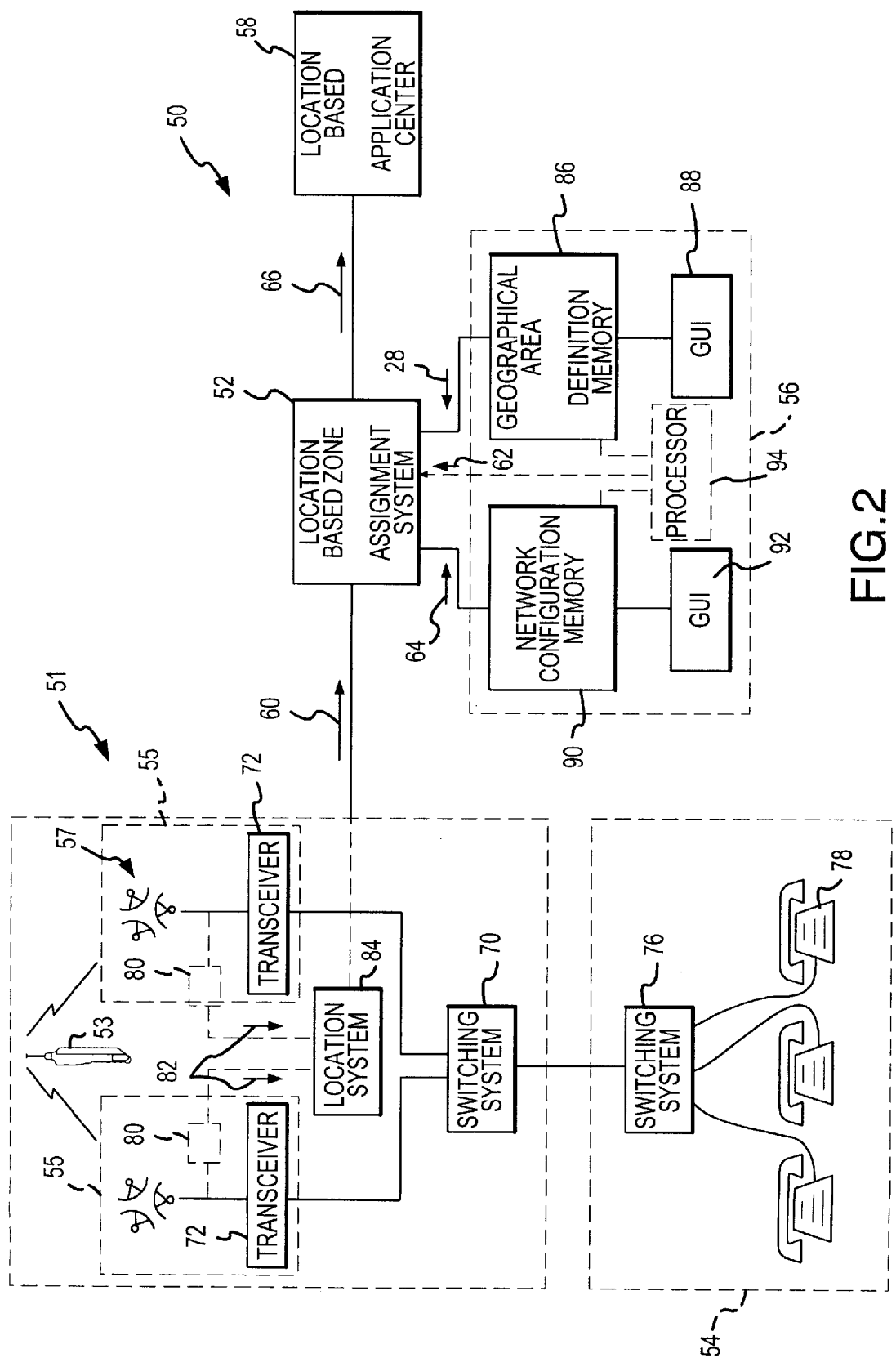
FIG. 2 is a schematic drawing illustrating a simplified communication system utilizing a location-based zone assignment system for the wireless communication network of FIG. 1, in accordance with the present invention.

One type of location system, described in detail in FIG. 2, identifies the location of the wireless communication device 16 relative to the various network zones 20 and their respective coverage areas 22. Various types of location systems for providing a location of the wireless communication device 16 have been implemented or proposed. Depending on the type of location system, the location may be determined by equipment within the wireless communication device 16, by logic resident at the base station 14, on a switch, or on a separate platform within the wireless communication network 12. In other location systems, no dedicated location finding equipment is required. For example, in cell/sector location systems, the approximate location of the wireless communication device 16 is determined based on the cell sector that is handling communications with the wireless communication device 16. Such cell/sector identification information is already encoded into network communications.

An embodiment of a cell/sector location system is illustrated in FIG. 1. In the embodiment illustrated, the antenna system 18 is divided into three separate antennas with each antenna responsible for a sector 24. As illustrated in FIG. 1, the coverage area 22 of each cell is the sum of the coverage areas of the three antennae, where the coverage area of each antenna is approximately 120 degrees. Utilizing only cell/sector location techniques, the location of the wireless communication device 16 can be narrowed down to a specific sector 24 of a specific base station 14 within the wireless communication network 12. Additional location methods may be employed to further refine the location of the wireless communication device 16. For example, time difference of arrival (TDOA) methods may be used to determine the approximate distance the wireless communication device 16 is from the antenna system 18. The accuracy and nature of the location information are determined by the particular locating method.

As will be discussed in greater detail below, some location-based service applications including certain billing applications utilize a record that is based on the location of the wireless communication device 16 relative to a geographical area definition. The geographical area definition comprises a defined set of geographical boundaries, coordinates, cell sectors, grid elements, and the like, that define specific operating zones 30. For example, in location-dependent billing applications using a cell/sector location system, predefined operating zones 30 having different billing rates are created. In practice, the cell sector of a residence of a user can be defined as a primary operating zone 30(a) and the area outside of the primary operating zone 30(a) can be defined as a general operating zone 30(b). In this example, when the user places a call from within the primary operating zone 30(a), the user is charged a first billing rate, e.g., a billing rate comparable to a typical land line, whereas, when a call is placed from the general operating zone 30(b), the user is charged a second billing rate, e.g., the normal billing rate for that carrier/calling plan. Additional operating zones 30 can be defined in the geographical area definition 28. For example, the business location of the user can be defined as a secondary operating zone 30(c), with a billing rate commensurate with business calls. It will be understood that other suitable types of location-based service applications may be used without departing from the scope of the present invention. For example, location-based service applications may be used to route calls to or provide information regarding the nearest pizza delivery, car towing service, and motel, as well as provide position information for vehicle alarms and emergencies.

FIG. 2 is a schematic drawing illustrating one embodiment of a simplified communication system 50 utilizing a location-based zone assignment system 52. The simplified communication system 50 comprises a wireless communication network 51, an external communications system 54, a wireless communication network data center 56, a location-based application center 58, and the location-based zone assignment system 52. Although the communication system 50 is illustrated with the wireless communication network 51, the wireless communication network data center 56, the location-based application center 58, and the location-based zone assignment system 52 as separate and distinct components, it will be understood that portions of these components may reside on a platform associated with the switching system 70 (not expressly shown).

In general, the wireless communication device 53 communicates with the external communications system 54 through the wireless communication network 51. As discussed previously, the wireless communication network 51 determines the location of the wireless communication device 53 within the wireless communication network 51. The wireless communication network 51 provides location information 60 which can be accessed by the location-based zone assignment system 52 in either real time or on a time delayed basis. For network based location systems such as cell or cell sector systems, the location information may include a cell or sector identifier. For other systems, if it is desired to express the user's location in terms of network topology, the location-based zone assignment system 52 can obtain a current network area definition 62 for correlation with the location information 60.

As noted above in connection with FIG. 1, specific location-based services application such as location based billing applications operated based on an operating zone definition defining one or more operating zones (e.g., a home billing zone, a work billing zone and a general billing zone). In a preferred implementation of the present invention, the operating zone definition is stored in terms independent of network topology, and is interpreted in terms of a current network topology at the time of making a location determination. In this manner, detailed zone definitions do not need to be revised in the event of changes in network topology.

Figure 6:
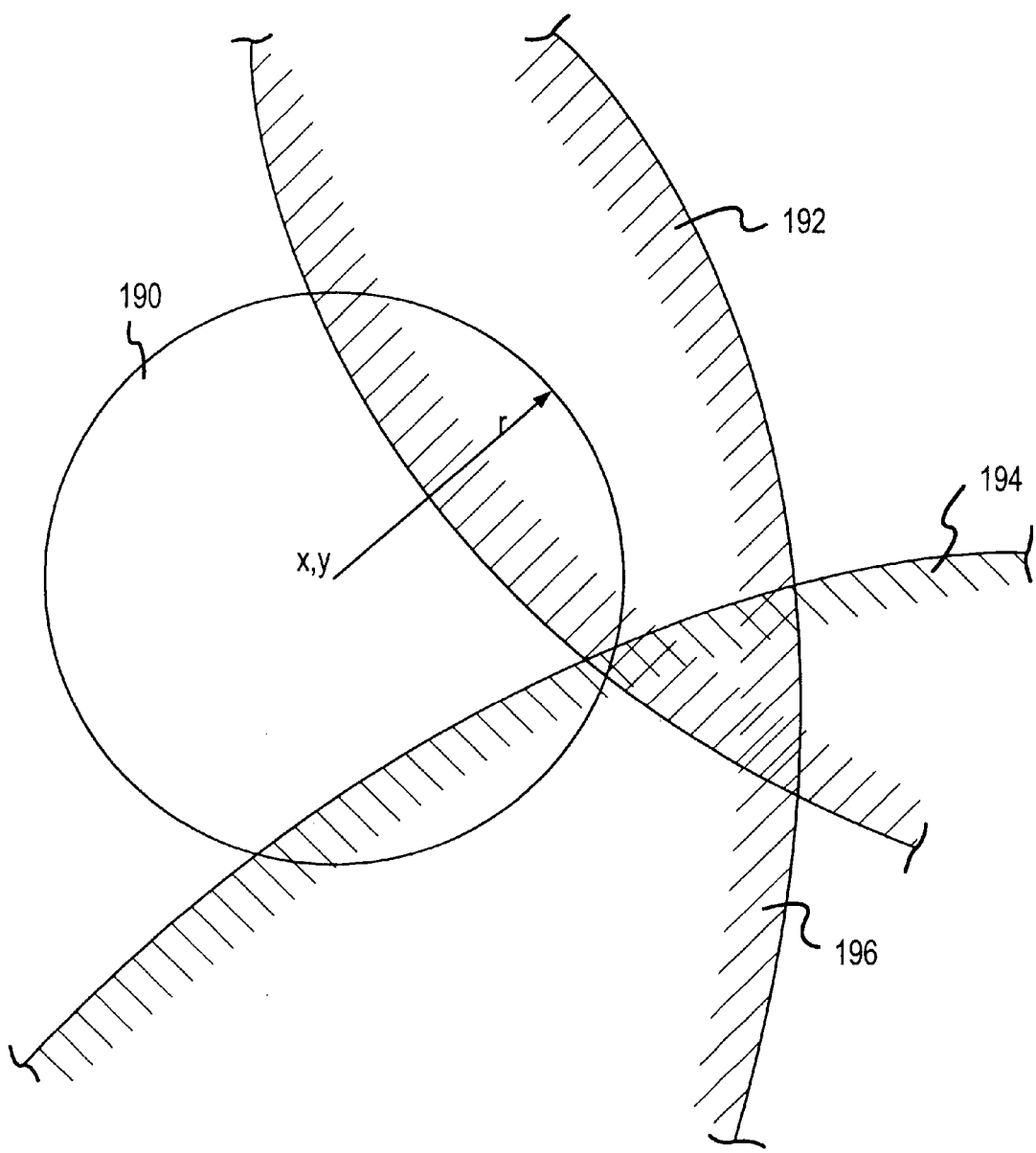
FIG. 6 is an illustration of various network coverage areas and an operating zone that may be utilized by a location based services application in accordance with the present invention.
Figure 7:
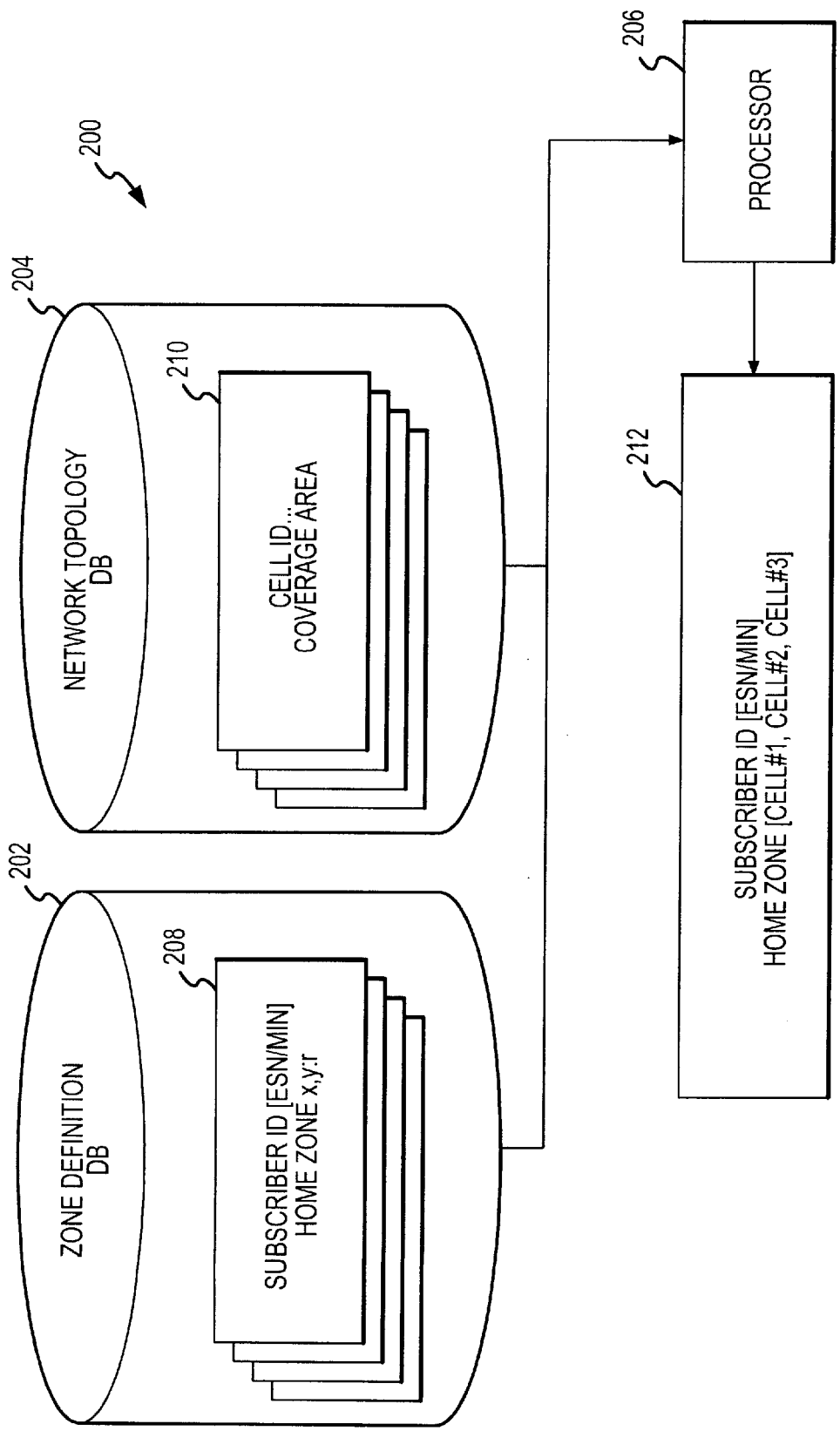
FIG. 7 is a schematic diagram of a processing system in accordance with the present invention for expressing an operating zone definition in terms of network topology.
Figure 8:
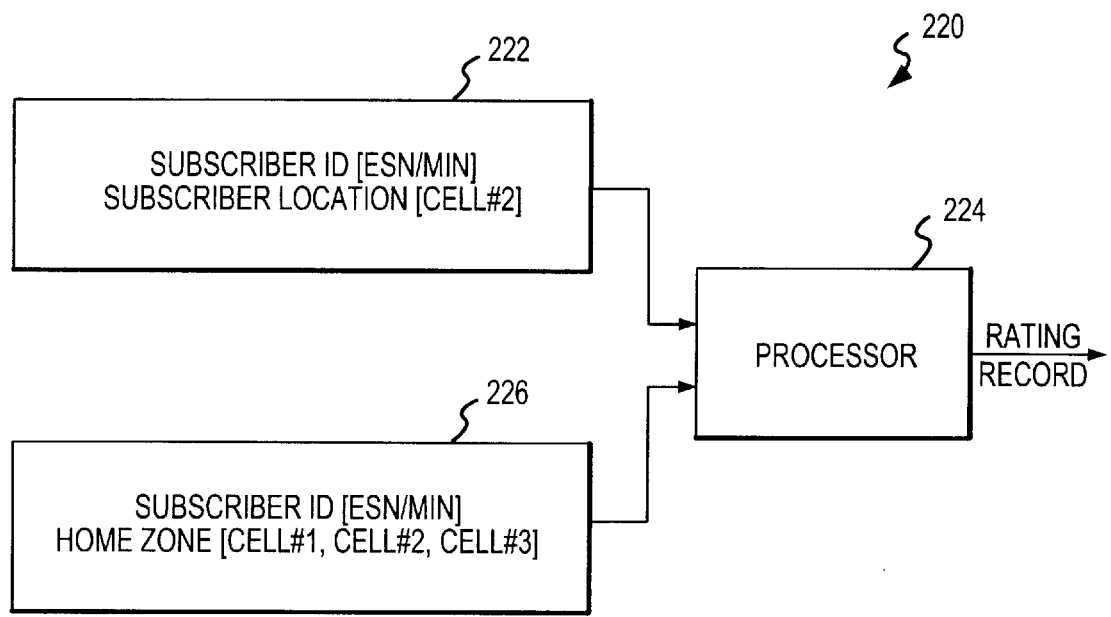
FIG. 8 is a schematic diagram of a processing system in accordance with the present invention for comparing a wireless unit location to an operating zone definition.

The associated structure and processes are schematically illustrated in FIGS. 6–8. FIG. 6 illustrates the relationship between an operating zone 190 and the coverage areas 192, 194 and 196 of, for example, three cells. For purposes of illustration, the operating zone 190 and the coverage areas 192, 194 and 196 are shown as being circular, but it will be appreciated that the zone 190 and coverage areas 192, 194 and 196 may have various configurations. One example where circular operating zones might be defined relates to billing zones of a location-based billing application. Optionally, a home zone in such an application may be defined by reference to the geographical coordinates (x, y in FIG. 6) of the subscriber's residence and a radius (r) therefrom. An operating zone may coincide with the coverage areas of multiple cells of a wireless network. This may be because the zone is larger than the cells, because of overlap of coverage areas of adjacent cells, because the operating zone lies on a boundary between cells, because of uncertainty in the home zone definition or other factors. In the illustrated embodiment, the operating zone 190 overlaps with three different coverage areas 192, 194 and 196. Thus, if only the cell location of a mobile unit was known, then a call from within any of the coverage areas 192, 194 and 196 might be within the operating zone 190. Accordingly, a location-based billing application may be programmed to apply a home zone billing rate for calls in any of the coverage areas 192, 194 and 196. It will be apparent that this determination regarding the billing rate is dependent on the network topology definition employed. Certain proposed systems have envisioned storing the operating zone definition by reference to cell identifiers. However, such an approach entails substantial revision of the stored operating zone definitions in connection with changes in network topology, e.g., subscriber-by-subscriber revisions of home zone definitions.

In accordance with the present invention, operating zone definitions may be stored in terms independent of network topology and then correlated to current network topology at or near the time of making a location determination. FIG. 7 shows a processing system 200 for use in expressing the zone definition in terms of current network topology. Generally, the system 200 includes a zone definition database 202, a current network topology database 204, and a processor 206. The zone definition database 202 stores a definition of an operating zone in terms independent of network topology. In the illustrated example, the database stores files 208 including a subscriber identifier (e.g., an ESN/MIN) and a home zone definition in terms of geographical coordinates and a radius. The network topology database 204 stores the current network topology. In the illustrated example, the database 204 includes files 210 storing cell identifiers and corresponding coverage area coordinates or boundaries. Alternatively, the home zone and coverage areas may be defined by reference to cells of a quad-tree data structure. At or near a time when a location determination is desired, the processor retrieves a file 208 from database 202 for the subscriber at issue and compares the subscriber's home zone to the current network topology definition in order to identify the current network cells corresponding to the home zone. Based on this comparison, the processor can store a record 212 expressing the home zone in terms of current network topology (e.g., cells #1, #2 and #3 of FIG. 6).

FIG. 8 illustrates how this record can be used in making a location determination. It will be appreciated that the processing system 220 of FIG. 8 may be embodied in the same or a different platform relative to system 200 of FIG. 7. Referring to FIG. 8, the illustrated processing system includes a processor 224 that receives a record 222 identifying the location of a subscriber's wireless unit by reference to network topology. In the illustrated example, the record 222 indicates that the subscriber is in cell #2 (see FIG. 6). The processor 224 also receives a record 226 expressing the home zone location in terms of current network topology, in this case identifying cells #1, #2 and #3 of FIG. 6. The processor 224 can then compare record 222 to record 226 to determine whether there is an overlap between the subscriber location of record 222 and the home zone of record 226. In this case, there is overlap because both records 222 and 226 identify cell #2. Accordingly, the processor 224 may deem the subscriber to be in his home zone and generate an appropriate billing rate record.

Referring again to FIG. 2, the current network can thus be used in defining the application operating zone for purposes of a location determination. In this regard, the current network area definition 62 describes at least one operating zone 30 in terms of a current network configuration definition 64. The current network configuration definition 64 describes the configuration, i.e., the network zones 20 and their respective coverage areas of the wireless communication network 51 at the time of the call. The location-based zone assignment system 52 compares the location of the wireless communication device 53 to the current network topology definition 62 to determine in which operating zone 30 the wireless communication device 53 is operating. The location-based zone assignment system 52 produces a record 66 based on which operating zone the wireless communication device 53 is operating within during the call. For example, the record may be a rating value that can be incorporated into a call detail record (CDR) or the like. In the case of a home zone billing application where it is desired to bill a subscriber based on whether a call is within or outside of a home zone, the billing record can be a value, such as a "0" or a "1", inserted into a defined field of the call detail record (CDR) transmitted by the switch or other component. The location-based application center 58, e.g., a platform running a billing program, receives the record 66 and processes the record in accordance with the applicable location-based service application.

As illustrated in FIG. 2, the wireless communication network 12 comprises a switching system 70 coupled to one or more of the base stations 55, typically through land lines. Each base station 55 includes a transceiver system 72 coupled to an antenna system 57. The transceiver system 72 communicates, via the antenna system 57, with each wireless communication device 53 over discrete radio frequency channels. The transceiver system 72 assigns a radio frequency channel to the wireless communication device 53 when service, i.e., a call, is initiated. When a call is placed from the wireless communication device 53, the antenna system 57 receives the radio frequency communication signals from the wireless communication device 53 and outputs an electronic signal to the transceiver system 72. The transceiver system 72 demodulates the electronic signal and routes the call to the switching system 70, which routes the call, for example, to the external communications system 52, which is generally a conventional telecommunications system. The external communications system 54 comprises a switching system 76 and a number of communication devices 78. The switching system 76 routes the call to the appropriate communication device 78.

In one embodiment, as shown by the dashed lines, each base station 55 (or alternatively each wireless communication device 53) includes location equipment 80. The location equipment 80 produces raw location data 82 based on the location of the wireless communication device 53 relative to the antenna system 51. The location equipment 80 may be based on any suitable system reference location method, such as microcell, angle of arrival (AOA), time of arrival (TOA), time difference of arrival (TDOA) and the like. The raw location data 82 is communicated to a location system 84.

In an embodiment using location equipment 80, at least one location system 84 is associated with each base station 55 to provide the location information 60. As discussed previously, the location information 60 describes the location of the wireless communication device 53 relative to the network zones 20 and their respective coverage areas 22 within the wireless communication network 12. The location system 84 may utilize several different techniques to obtain the most accurate location of the wireless communication device 53, as well as derivative location information such as travel direction and rate.

In another embodiment, the base station 55 does not include dedicated location equipment 80. In this embodiment, the location of the wireless communication device 16 is determined using location information that is present within network transmissions. For example, cell/sector based location systems already have encoded within the wireless communications the identity of the cell and sector that is handling communications with the wireless communication device 53, and thus, the cell and sector where the wireless communication device 53 is located.

The location information 60 communicated to the location-based zone assignment system 52 includes the location of the wireless communication device 53 relative to current network topology at the time the call was initiated. The location information 60 may also include the location of the wireless communication device 53 either on a continuous, occasional, or periodic basis over the duration of the call. As discussed previously, the location information 60 is communicated to the location-based zone assignment system 52 either on a real time basis or on a delayed time basis, depending upon the requirements of the location-based service application. For example, location-based call routing applications are typically performed on a real time basis.

The location-based zone assignment system 52 generally resides in a platform associated with the switching system 70 (not expressly shown). The location-based zone assignment system 52 performs a comparison of the location information 60 with the current network area definition 62 and produces the record 66 based on which operating zone the wireless communication device 53 is located within during the call. The particular type of comparative technique used by the location-based zone assignment system 52 depends upon the form of the location information 60 and the current network area definition 62. For example, if the location information 60 and the current network area definition 62 are in the form of cell/sector identifiers as in the example above, the cell/sector identifier from the location information 60 is directly compared to the cell/sector identifiers that describe the operating zones defined within the current network area definition 62.

The current network area definition 62 describes the geographical area definition 28, and thus the operating zones, in terms of the wireless communication network 51 instead of geographical terms. In other words, the current network area definition 62 attempts to describe the same boundaries, or plot of land, as described by the geographical area definition 28. In one embodiment, as illustrated by the solid lines, the wireless communication network data center 56 provides the current network area definition 62 and the current network configuration definition 64 to the location-based zone assignment system 52. The location-based zone assignment system 52 then translates the geographical area definition 28 into the current network area definition 62 using the current network configuration definition 64. This embodiment allows the geographical area definition 28 to easily be translated to the current network area definition 62 each time a call is initiated. In another embodiment, as illustrated by the dotted lines, the current network area definition 62 is determined by the wireless communication network data center 56. In this embodiment, the geographical area definition 28 is typically translated to the current network area definition 62 prior to the initiation of a call. The current network area definition 62 for each user can then be automatically updated periodically or each time the configuration of the wireless communication network 51 is modified. It will be understood that the current network area definition 62 may be otherwise suitably calculated using the current network configuration definition 64 without departing from the scope of the present invention. For example, the current network area definition 62 may be stored by the location-based zone assignment system 52 and periodically updated.

The wireless communication network data center 56, as illustrated in FIG. 2, comprises a geographical area definition memory 86 and an associated user interface 88, as well as a network configuration memory 90 and an associated graphical user interface 92. The wireless communication network data center 56 may be operated by the network provider of the wireless communication network 51 or a third party. The geographical area definition memory 86 stores the geographical area definition 28, i.e., the operating zones, on a subscriber-by-subscriber basis. The user interface 88 allows the network provider to add or modify the geographical area definitions 28 stored within the geographical area definition memory 86. The network configuration memory 90 stores the configuration of the wireless communication network 51. The user interface 92 allows the stored configuration of the wireless communication network 51 to be updated to reflect changes in the network zones and their respective coverage areas. The network configuration memory 90 may be updated on a continuous basis each time the configuration of the wireless communication network 51 changes, or on a periodic basis that includes multiple configuration changes to the wireless communication network 51. In an alternative embodiment, the wireless communication network data center 56 includes a processor 94 that operates to produce the current network area definition 62 from the geographical area definition 28 and the current network configuration definition 64. This embodiment allows the current network area definition 62 to be determined prior to initiation of the call and stored by either the location-based zone assignment system 52 or the wireless communication network data center 56.

The location-based application center 58 may be generally operated by the network provider or a third party. The record 66 is received and processed in accordance with the particular location-based service application. For example, in the case of location-based emergency services, the record 66 may be used to route the call to the appropriate emergency personnel. In location-dependent billing applications, the record 66 reflects which operating zone the wireless communication device 53 was located in during the call. The user is charged a differential billing rate for each operating zone. In location-based emergency applications, the location of the wireless communication device 53 is relayed to the proper authorities. For example, the location of a stolen vehicle can be relayed to the proper authorities. It will be understood that the location-based application center 58 may utilize other suitable location-based service applications without departing from the scope of the present invention.

Figure 3:
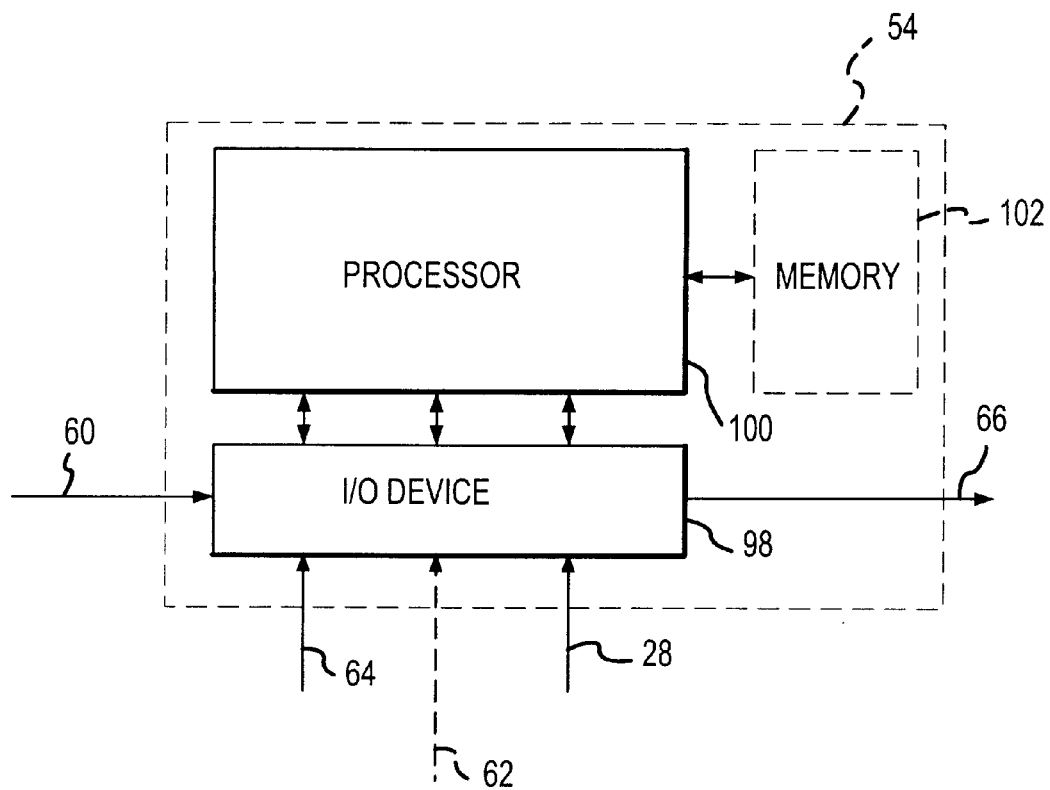
FIG. 3 is a schematic drawing illustrating a location-based zone assignment system, as shown in FIG. 2, in accordance with the present invention.
Figure 4:
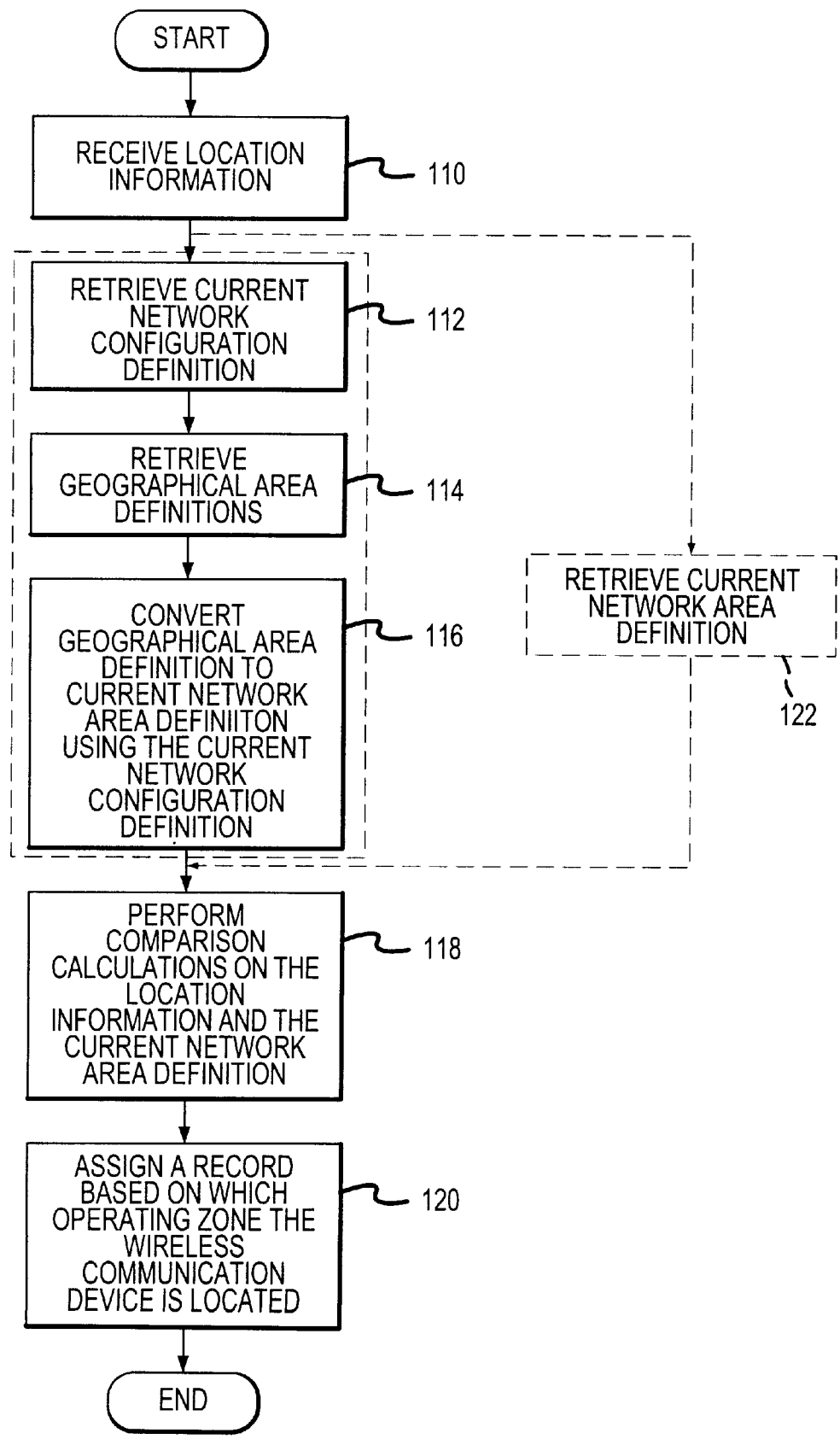
FIG. 4 is a flow diagram illustrating the operation of the location-based zone assignment system of FIG. 3 in accordance with the present invention.

FIG. 3 is a schematic drawing illustrating one embodiment of the location-based zone assignment system 52. FIG. 4 is a flow diagram illustrating the operation of the location-based zone assignment system 52. Referring to FIG. 3, the location-based zone assignment system 52 comprises an input/output device 98, a processor 100, and a memory 102. In one embodiment, as illustrated with solid lines, the input/output device 98 receives the location information 60, as shown by step 110 in FIG. 4. The location information 60 is relayed to the processor 100. The processor 100 then requests and receives the current network configuration definition 64 and the geographical area definition 28, as shown by steps 112 and 114 in FIG. 4. The processor 100 translates the geographical area definition 28 into the current network area definition 62 using the current network configuration definition 64, as shown by step 116 in FIG. 4. As will be discussed in greater detail below, the processor 100 applies a comparative algorithm to the location information 60 and the current network area definition 62 to determine which operating zone the wireless communication device 53 is operating within during the call, as shown by step 118 in FIG. 4. The processor 100 repetitively compares the location information 60 to the current network area definition 62 for each relevant time period. The processor 100 assigns a record 66 that contains information regarding which operating zone the wireless communication device 53 was located within during the call, as shown by step 120 in FIG. 4. For example, in location-dependent billing applications, the record 66 may contain information on the total time within each operating zone for each call. In location-based routing applications having only two operating zones, the record 66 may be in the form of a "1" or a "0," indicating that the call is either "in" or "out" of one of the operating zones. The record 66 is output via the input/output device 98.

In another embodiment, as illustrated with dashed lines, the location information 60 is received by the input/output device 98 and relayed to the processor 100, as shown by step 110 in FIG. 4. The processor 100 then requests and receives the current network area definition 62 that is specific to the user or application, as shown by step 122 in FIG. 4. The current network area definition is obtained either from the memory 102 or through the input/output device 98. The record 66 is then generated as described above, as shown by steps 118 and 120 in FIG. 4. It will be understood that the location-based zone assignment system 52 may comprise other suitable devices and systems without departing from the scope of the present invention.

Figure 5:
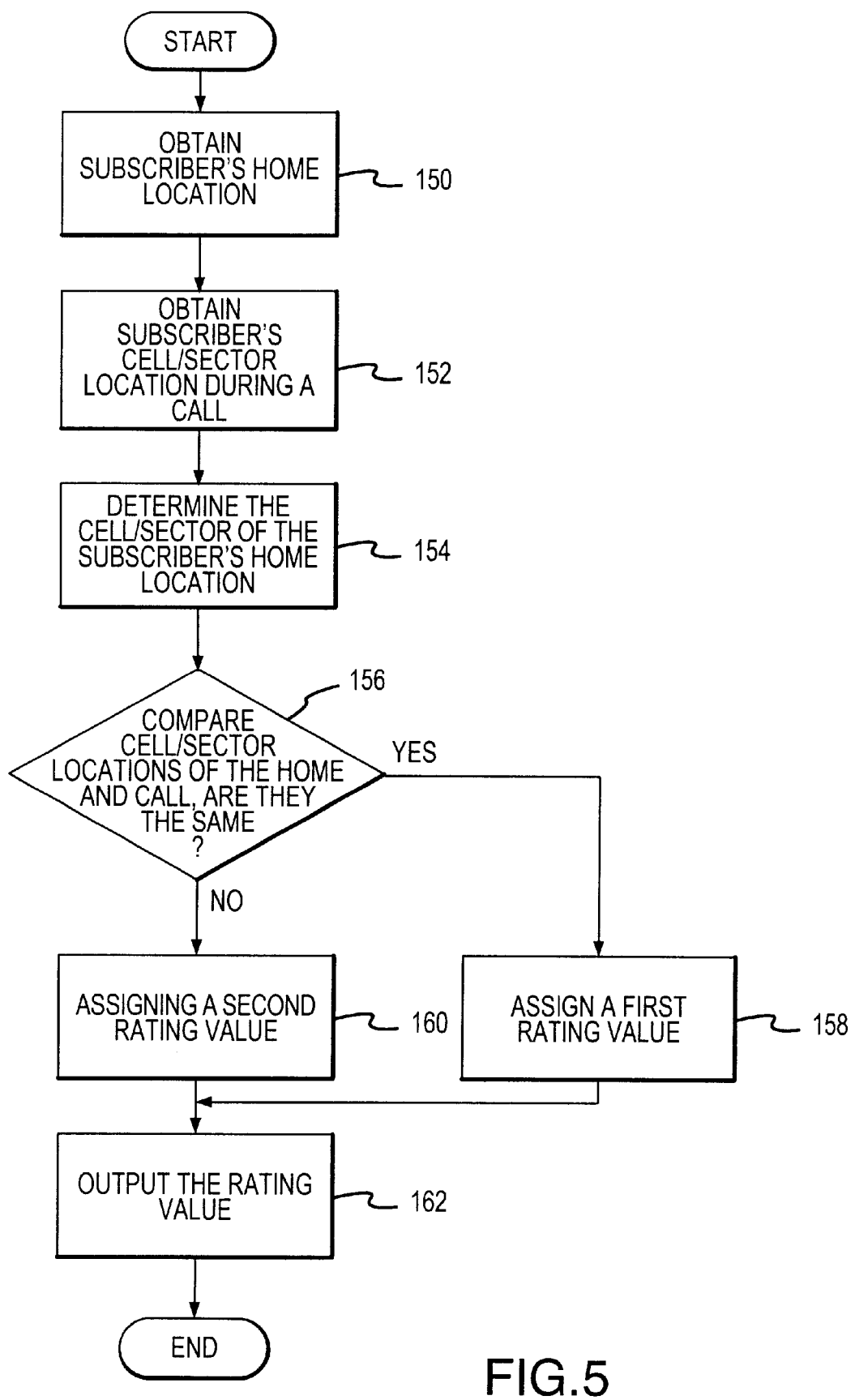
FIG. 5 is a flow diagram illustrating the operation of a specific location-based zone assignment system using cell/sector based information in accordance with the present invention.

FIG. 5 is a flow diagram illustrating the operation of a specific location-based zone assignment system 52 using cell/sector based information. In this embodiment, the subscriber's home location is initially obtained, as shown by step 150. The subscriber's home location could be obtained directly from the subscriber in the form of an address and then translated into geographical coordinates using a GIS application. The subscriber's home location could also be obtained through the wireless communication network 51, by the subscriber entering a code on the wireless communication device 53 that locates the wireless communication device 53. The subscriber's home location is stored as a geographical location, such as a street address, longitude and latitude, grid coordinate, zip code, and the like. The subscriber's location forms a subscriber specific operating zone and geographical area definition 28.

The location of the subscriber, i.e., the wireless communication device 53, is obtained during a call, as shown by step 152. The location of the subscriber, i.e., the location information 60, comprises a distinct cell/sector identifier for the cell and sector of the base station 55 that is communicating with the subscriber's wireless communication device 53 during the call.

The cell and sector corresponding to the subscriber's home location, i.e., the geographical area definition 28, is then determined, as shown by step 154. The cell and sector corresponding to the subscriber's location is based on the current configuration of the wireless communication network 51. As discussed previously, the current configuration of the wireless communication network 51 is described by the current network configuration definition 64. The current cell/sector of the subscriber's location, i.e., the current network area definition 62, is stored as a cell/sector identifier.

The cell/sector identifier corresponding to the location of the subscriber, i.e., the location information 60, is compared to the cell/sector identifier corresponding to the subscriber's home location, i.e., the current network area definition 62, as shown by step 156. If the cell/sector identifiers are the same or overlap, which generally indicates that the wireless communication device 53 is being operated from the subscriber's home location, then a first rating value, i.e., record 66, is assigned, as shown by step 158. If the cell/sector identifiers are not the same, which generally indicates that the wireless communication device 53 is being operated from an area outside of the subscriber's home location, then a second rating value, i.e., record 66, is assigned, as shown by step 160.

The appropriate rating value may contain a value indicating that the wireless communication device 53 is "in" or "out" of the subscriber's home location. The value, such as a "0" or "1," may be inserted into a defined field withing call detail record (CDR) and transmitted by the switch or other component, as shown by step 162. It will be appreciated that additional subscriber locations, i.e., operating zones, can be readily defined and used to define distinct billing rates charged to the subscriber.

Although the present invention has been described in several embodiments, various changes and modifications may be suggested to one skilled in the art. It is intended that the present invention encompass such changes and modifications that fall within the scope of the appended claims.

What is claimed is:

1. A method for use in locating a wireless unit relative to one or more operating zones of a location based services application, comprising the steps of:
   receiving unit location information regarding a unit location of said wireless unit, wherein said unit location information is expressed in terms that are one of independent of network topology and based on network topology;
   accessing a current network topology definition including current network location information regarding one or more current network subdivisions;
   accessing an operating zone definition including zone location information for said one or more operating zones of said location based services application, wherein said operating zone definition is expressed in terms that are one of independent of network topology and based on network topology;
   processing at least one of said unit location information and operating zone information using said current network topology definition to obtain processed information such that said unit location information and operating zone information are expressed in common terms;
   performing a comparison of said unit location to said operating zone definition using said processed information; and
   wherein said current network topology definition describes a topology of said network substantially at a time of said comparison.

2. A method as set forth in claim 1, wherein said step of receiving unit location information comprises receiving information from location finding equipment.

3. A method as set forth in claim 1, wherein said step of receiving unit location information comprises receiving information regarding a network subdivision within which said wireless unit is located.

4. A method as set forth in claim 1, wherein said step of accessing said current network topology definition comprises accessing information regarding the locations of one of network cells and network cell portions.

5. A method as set forth in claim 1, wherein said step of accessing said current network topology comprises accessing a most recent network topology definition available as of a time of receipt of said unit location information.

6. A method as set forth in claim 1, wherein said step of accessing said current network topology definition is conducted after said step of receiving unit location information.

7. A method as set forth in claim 1, wherein said location based services application is a location based call billing application, and said step of accessing an operating zone definition comprises obtaining a home zone definition associated with said wireless unit.

8. A method as set forth in claim 1, wherein said step of performing a comparison comprises obtaining said operating zone definition in first terms independent of network topology, obtaining said unit location in second terms related to network topology, and processing at least one of said unit location and said operating zone definition such that said unit location and operating zone definition are expressed in common terms.

9. A method as set forth in claim 1, further comprising the step of generating application information based on said step of performing a comparison, wherein said location based services application can provide an output based on a determined location of said wireless unit in relation to said operating zone definition.

10. A method as sat forth in claim 1, wherein said location based services application is a location based call billing application, and said application information is information relating to a call rating value.

11. A method for use in locating a wireless unit relative to one or more billing zones of a location based billing application, said method comprising the steps of:
    establishing a billing zone definition of one or more billing zones at a first time, wherein a wireless network has a first network topology at said first time, said first network topology relating to first coverage areas of first network structures at said first time;
    receiving unit location information regarding a unit location of said wireless unit, said unit location information being established at a second time wherein said wireless network has a second network topology at said second time, said second network topology relating to second coverage areas of second network structures at a second time, wherein said second network topology is different than said first network topology;
    wherein at least one of said unit location information and said billing zone definition is expressed in terms of one of said first network topology and said second network topology; and
    making a determination regarding a billing zone of said wireless unit based on said unit location established at said second time associated with said second network topology, and said billing zone definition established at said first time associated with said first network topology, wherein said determination can be made despite a difference between said first network topology and said second network topology.

12. A method as set forth in claim 11, wherein said step of establishing comprises defining said one or more billing zones independent of said first network topology.

13. A method as set forth in claim 11, wherein said step of establishing comprises obtaining topological information defining said one or more billing zones in relation to said first network topology and processing said topological information to express said billing zone definition in terms independent of said first network topology.

14. A method as set forth in claim 11, wherein said step of receiving comprises receiving information related to a subdivision of said wireless network within which said wireless unit is located.

15. A method as set forth in claim 11, wherein said step of making a determination comprises comparing said unit location to said billing zone to determine whether said unit location is inside or outside of said billing zone.

16. A method as set forth in claim 11, wherein said step of making a determination comprises providing a topological definition of a location of said billing zone in relation to said second network topology and comparing said topological definition to said unit location.

17. A method as set forth in claim 11, further comprising the step of generating billing information based on said determination.

18. A system for use in locating a wireless unit relative to one or more operating zones of a location based services application, comprising:

1) memory structure for storing:
   1a) a first network topology definition including current network location information regarding one or more network subdivisions; and
   1b) an operating zone definition including zone location information for said one or more operating zones of said location based services application, said operating zone definition being expressed in terms independent of said network topology definition; and
2) processor structure operative for:
   2a) receiving unit location information regarding a unit location of said wireless unit;
   2b) accessing said operating zone definition and said current network topology definition stored in said memory structure;
   2c) performing a comparison of said unit location to said operating zone definition using said network topology definition, said network topology definition relating to areas of coverage associated with said network subdivisions.

19. A system as set forth in claim 18, wherein said processor structure is operative for accessing said network topology definition in response to receiving said unit location information.

20. A system as set forth in claim 18, wherein said processor structure is operative for receiving topological information defining said one or more operating zones in relation to a second network topology definition existing at a first time and deriving said operating zone definition from said second network topology definition, said second network topology definition being different from said first network topology definition.

21. A system as set forth in claim 20, wherein said processor structure is operative to correlate said unit location to said operating zone definition by obtaining said unit location by reference to said first network topology definition, using said first network topology definition to identify a geographical location of wireless unit, and comparing said geographical location.

* * * * *

UNITED STATES PATENT AND TRADEMARK OFFICE
CERTIFICATE OF CORRECTION

PATENT NO.   : 6,424,840 B1
DATED        : July 23, 2002
INVENTOR(S)  : James A. Fitch and David L. Hose It is certified that error appears in the above-identified patent and that said Letters Patent is hereby corrected as shown below:

<u>Column 13, line 9 through Column 16, line 19,</u>
Please delete Claims 1-21 and insert Claims 1-8 and 10-22 as follows:

1. A method for use in locating a wireless unit relative to one or more operating zones of a location based services application, comprising the steps of:

establishing at least a first operating zone definition at a first time wherein a wireless network has a first network topology defined by a first network topology definition at said first time;

receiving unit location information regarding a unit location of said wireless unit at a second time wherein at least one of said operating zone definition and unit location information is expressed in terms of a second network topology defined by a second network topology definition associated with said second time;

accessing said second network topology definition associated with said second network topology of said wireless network at said second time, wherein said second network topology is different from said first network topology due to changes in said wireless network between said first time and said second time, said second network topology definition including network location information regarding one or more network subdivisions;

converting, using said second network topology definition associated with said second network topology of said second time, at least one of said operating zone definition and said unit location information such that said unit location information and operating zone definition are expressed in common terms; and performing a comparison of said unit location to said operating zone definition.

2. A method as set forth in Claim 1, wherein said step of receiving unit location information comprises receiving information from location finding equipment.

3. A method as set forth in Claim 1, wherein said step of receiving unit location information comprises receiving information regarding a network subdivision within which said wireless unit is located.

UNITED STATES PATENT AND TRADEMARK OFFICE
CERTIFICATE OF CORRECTION

PATENT NO.    : 6,424,840 B1
DATED         : July 23, 2002
INVENTOR(S)   : James A. Fitch and David L. Hose It is certified that error appears in the above-identified patent and that said Letters Patent is hereby corrected as shown below:

Columns 13-16 (cont'd),

4. A method as set forth in Claim 1, wherein said step of accessing said second network topology definition comprises accessing information regarding the locations of one of network cells and network cell portions.

5. A method as set forth in Claim 1, wherein said step of accessing said second network topology definition comprises accessing a most recent network topology definition available as of a time of receipt of said unit location information.

6. A method as set forth in Claim 1, wherein said step of accessing said second network topology definition is conducted after said step of receiving unit location information.

7. A method as set forth in Claim 1, wherein said location based services application is a location based call billing application, and said step of establishing a zone definition comprises establishing a home zone definition associated with said wireless unit.

8. A method as set forth in Claim 1, wherein said step of performing a comparison comprises obtaining said operating zone definition in first terms independent of network topology, obtaining said unit location in second terms related to said second network topology and converting said operating zone definition such that said unit location and operating zone definition are expressed in common terms of said second network topology.

10. A method as set forth in Claim 1, further comprising the step of generating application information based on said step of performing a comparison, wherein said location based services application can provide an output based on a determined location of said wireless unit in relation to said operating zone definition.

11. A method as set forth in Claim 1, wherein said location based services application is a location based call billing application, and said application information is information relating to a call rating value.

UNITED STATES PATENT AND TRADEMARK OFFICE
CERTIFICATE OF CORRECTION

PATENT NO. : 6,424,840 B1
DATED : July 23, 2002
INVENTOR(S) : James A. Fitch and David L. Hose It is certified that error appears in the above-identified patent and that said Letters Patent is hereby corrected as shown below:

Columns 13-16 (cont'd),

12. A method for use in locating a wireless unit relative to one or more billing zones of a location based billing application, said method comprising the steps of:

establishing a billing zone definition of one or more billing zones at a first time, wherein a wireless network has a first network topology defined by a first network definition at said first time;

receiving unit location information regarding a unit location of said wireless unit at a second time wherein at least one of said billing zone definition and unit location information is expressed in terms of a second network topology defined by a second network topology definition associated with said second time;

utilizing said second network topology definition to convert at least one of said billing zone definition and said unit location information into common terms; and making a determination regarding a billing zone of said wireless unit based on said unit location received at said second time associated with said second network topology, and said billing zone definition established at said first time associated with said first network topology, wherein said determination can be made despite a difference between said first network topology and said second network topology.

13. A method as set forth in Claim 12, wherein said step of establishing comprises defining said one or more billing zones independent of said first network topology.

14. A method as set forth in Claim 12, wherein said step of establishing comprises obtaining topological information defining said one or more billing zones in relation to said first network topology and processing said topological information to express said billing zone definition in terms independent of said first network topology.

15. A method as set forth in Claim 12, wherein said step of receiving comprises receiving information related to a subdivision of said wireless network at said second time within which said wireless unit is located.

16. A method as set forth in Claim 12, wherein said step of making a determination comprises comparing said unit location to said billing zone to determine whether said unit location is inside or outside of said billing zone.

UNITED STATES PATENT AND TRADEMARK OFFICE
CERTIFICATE OF CORRECTION

PATENT NO. : 6,424,840 B1
DATED : July 23, 2002
INVENTOR(S) : James A. Fitch and David L. Hose It is certified that error appears in the above-identified patent and that said Letters Patent is hereby corrected as shown below:

Columns 13-16 (cont'd),

17. A method as set forth in Claim 12, wherein said step of making a determination comprises providing a topological definition of a location of said billing zone in relation to said second network topology and comparing said topological definition to said unit location.

18. A method as set forth in Claim 12, further comprising the step of generating billing information based on said determination.

19. A system for use in locating a wireless unit relative to one or more operating zones of a location based services application, comprising:

1) memory structure for storing:

1a) an operating zone definition including zone location information for said one or more operating zones of said location based services application, said operating zone definition being established at a first time defined by a first network topology of said wireless network at said first time, said operating zone definition expressed in terms independent of said first network topology; and 1b) a second network topology definition associated with a network topology of said wireless network at said second time including network location information regarding one or more network subdivisions, wherein said first time network topology and said second time network topology are different; and 2) processor structure operative for:

2a) receiving unit location information regarding a unit location of said wireless unit at said second time, wherein at least one of said unit location information and said operating zone definition is expressed in terms of said second network topology;

2b) accessing said operating zone definition and said network topology definition stored in said memory structure;

2c) utilizing said second network topology definition to convert at least one of said operating zone definition and said unit location information into common terms;

UNITED STATES PATENT AND TRADEMARK OFFICE
CERTIFICATE OF CORRECTION

PATENT NO. : 6,424,840 B1
DATED : July 23, 2002
INVENTOR(S) : James A. Fitch and David L. Hose It is certified that error appears in the above-identified patent and that said Letters Patent is hereby corrected as shown below:

Columns 13-16 (cont'd), 2d)    performing a comparison of said unit location to said operating zone definition.

20. A system as set forth in Claim 19, wherein said processor structure is operative for accessing said network topology definition associated with a network topology of said wireless network at said second time in response to receiving said unit location information.

21. A system as set forth in Claim 19, wherein said processor structure is operative for receiving topological information defining said one or more operating zones in relation to a first network topology definition existing at a first time and deriving said operating zone definition from said second network topology definition associated with a network topology of said wireless network at said second time, said second network topology definition being different from said first network topology definition.

22. A system as set forth in Claim 21, wherein said processor structure is operative to correlate said unit location to said operating zone definition by obtaining said unit location by reference to said second network topology definition, using said second network topology definition to identify a geographical location of wireless unit, and comparing said geographical location.

Signed and Sealed this

Eighth Day of February, 2005

JON W. DUDAS
*Director of the United States Patent and Trademark Office*